(12) United States Patent
Fleming et al.

(10) Patent No.: US 11,296,506 B2
(45) Date of Patent: Apr. 5, 2022

(54) BIDIRECTIONAL CHARGING PANEL

(71) Applicant: The United States of America, as represented by the Secretary of the Navy, Arlington, VA (US)

(72) Inventors: Austin Galya Fleming, Newport Beach, CA (US); Elizabeth Ann Geiss, Coronado, CA (US); Benjamin William Rathwell, The Woodlands, TX (US); Anthony Gerard Pollman, Monterey, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/063,556

(22) Filed: Oct. 5, 2020

(65) Prior Publication Data

US 2021/0104892 A1    Apr. 8, 2021

Related U.S. Application Data

(60) Provisional application No. 62/911,046, filed on Oct. 4, 2019.

(51) Int. Cl.
*H02J 7/00* (2006.01)
*H02J 3/00* (2006.01)
(Continued)

(52) U.S. Cl.
CPC ............ *H02J 3/007* (2020.01); *H02J 7/0047* (2013.01); *H02J 7/04* (2013.01); *B60K 25/00* (2013.01); *H02J 7/007182* (2020.01)

(58) Field of Classification Search
CPC .. H02J 3/007; H02J 7/0047; H02J 7/04; H02J 7/00718; B60K 25/00
(Continued)

(56) References Cited

U.S. PATENT DOCUMENTS

| | | | |
|---|---|---|---|
| 2018/0273022 A1* | 9/2018 | Bell | B60L 53/20 |
| 2020/0062126 A1* | 2/2020 | Duan | B60L 15/00 |
| 2020/0100622 A1* | 4/2020 | Collins | B62D 33/0273 |

OTHER PUBLICATIONS

Buede, Dennis M (2009) The Engineering Design of Systems Models and Methods. 2nd ed. Sections 6.12-6.14. Hoboken, NJ: John Wiley and Sons.
(Continued)

*Primary Examiner* — Daniel Cavallari
*Assistant Examiner* — Dru Parries
(74) *Attorney, Agent, or Firm* — Naval Postgraduate School; Scott Bell

(57) ABSTRACT

The invention relates to a bidirectional charging panel (BCP). The BCP includes a relay for controlling a combustion engine and a battery voltage sensor for monitoring a battery voltage. The BCP also includes a grid switch to transfer continuous power between the battery and a grid interface, where the grid interface further includes a grid voltage sensor for monitoring a grid voltage of a grid of devices and a grid direct current outlet to transfer power to and from a grid of devices. The BCP also includes a controller to manage the flow of power between the battery and the grid of devices, where the controller uses the relay to start or stop the combustion according to the battery voltage and uses the grid interface to transfer power from the grid of devices to the battery in response to determining the battery voltage is lower than the grid voltage.

12 Claims, 4 Drawing Sheets

(51) Int. Cl.
*H02J 7/04* (2006.01)
*B60K 25/00* (2006.01)

(58) Field of Classification Search
USPC ........................................................ 307/10.6
See application file for complete search history.

(56) References Cited

OTHER PUBLICATIONS

Defense Acquisition University (Sep. 2017) Defense Acquisition Guidebook. Sections 3.1-3.2. Fort Belvoir, VA: Defense Acquisition University.
Feickert, Andrew. (2016) Joint light tactical vehicle (JLTV): Background and issues for congress. Federation of American Scientist. https://search.proquest.com/docview/1820850474.
Honda. (2009) Owner's Manual GX240, GX270, GX340, GX390. Wiring Diagrams. https://cf.hondappsv.com/files/OM/OM000215Global/37Z5F6111_4K-EN.
Hu, K, W., and C.M. Liaw. (Mar. 17-19, 2015) On a DC micro-grid incorporating with electric vehicle as movable energy storage source. vol. 2015-IEEE.
Jain, M., M. Daniele, and P.K. Jain. (Jul. 2000) A bidirectional DC-DC converter topology for low power application. Power Electronics, IEEE Transactions On 15 (4): 595-606.
Marine Corps Times (Feb. 28, 2017) "These Marine Units Are the First to Field the Newest Ground Combat Vehicle, the JLTV." https://www.marinecorpstimes.com/news/your-marine-corps/2019/02/28/these marine-units-are-the-first-to-field-the-newest-ground-combat-vehicle-the- jltv/.
Mazlan, Rozdman K. Experimental study on the effect of alternator speed to the car charging system. MATEC Conference 90, 01076. (2017). DOI: 10.105/matecconf/20179001076.

* cited by examiner

BIDIRECTIONAL CHARGING PANEL

This application claims priority to and the benefit of U.S. Application No. 62/911,046 filed Oct. 4, 2019, which is hereby incorporated in its entirety by reference.

FIELD OF THE INVENTION

The present invention is directed to a bidirectional charging panel with the ability to form a microgrid among several vehicles.

BACKGROUND

Militaries typically use dedicated fossil-fuel-powered generators for expeditionary military forces on the move. These generators require maintenance, logistical support, space, and a substantial amount of fuel to provide power generation. For example, a military unit may deploy with a collection of fossil-fuel-powered generators onboard their vehicles in order to provide power to large electrical loads while the unit is away from an established electrical grid. In this example, the military units are reliant on the portable generators in order to conduct their operations.

SUMMARY

Embodiments in accordance with the invention relate a bidirectional charging panel (BCP). The BCP includes a relay for controlling a combustion engine and a battery voltage sensor for monitoring a battery voltage. The BCP also includes a grid switch to transfer continuous power between the battery and a grid interface, where the grid interface further includes a grid voltage sensor for monitoring a grid voltage of a grid of devices and a grid direct current outlet to transfer power to and from a grid of devices. The BCP also includes a controller to manage the flow of power between the battery and the grid of devices, where the controller uses the relay to start or stop the combustion according to the battery voltage and uses the grid interface to transfer power from the grid of devices to the battery in response to determining the battery voltage is lower than the grid voltage.

DETAILED DESCRIPTION

Figure 1:
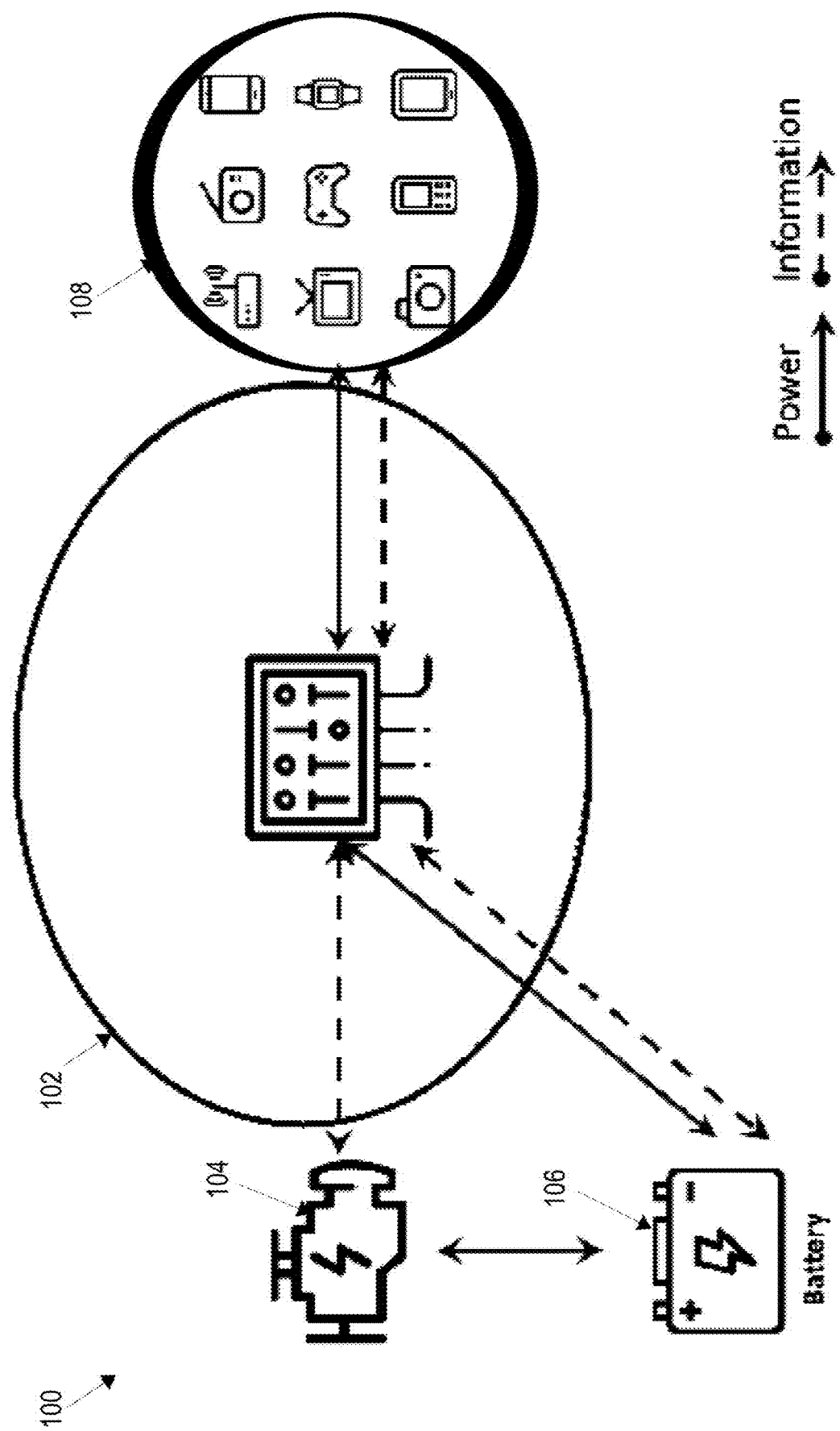
FIG. 1 shows an example power network with a BCP.

For illustrative purposes, the principles of the present disclosure are described by referencing various exemplary embodiments. Although certain embodiments are specifically described herein, one of ordinary skill in the art will readily recognize that the same principles are applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in different order as may be appreciated by one skilled in the art; the method embodiments described are therefore not limited to the particular arrangement of steps disclosed herein.

It is be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

Embodiment described herein describe a bidirectional charging panel (BCP) onboard conventional fossil-fuel-powered ground vehicles (e.g., military tactical vehicles). Fossil-fuel-powered ground vehicles currently are not designed with the ability to provide power to a substantial electrical load while still maintaining enough charge to operate as required in a transportation mode. Typically, a military unit deploys with a collection of fossil-fuel-powered generators onboard their vehicles in order to provide power to large electrical loads while the unit is away from an established electrical grid. Military units are reliant on the portable generators in order to conduct their operations. The BCP eliminates the need for these military units to transport generators, increasing the operational flexibility and forward-deployed longevity of the mobile units. The BCP also has the ability to form a microgrid among several tactical vehicles. In a microgrid configuration, a load too large for one vehicle to sustain for an extended period, such as spotlights or a refrigerator, can be distributed among several vehicles enabling the load to be successfully powered while, for example, ground forces are forward deployed.

Bi-directional charging is the flow of power for both charging and for discharging using the same component. Bi-directional technology is being explored extensively in the electrical vehicle industry as an effective means of power transformation between an established electrical grid and the electrical vehicle. The BCP described herein provides a solution to implement the benefits of bi-directional charging to typical combustion vehicles with a non-intrusive modification.

With a BCP, functions of a combustion engine can be applied to both the vehicle drive train and a load of peripherals. The bi-directional charging panel eliminates the need for extra personnel to support additional generators. This combination reduces the number of people, the amount of maintenance, the amount of logistical support, and the quantity of equipment required since the need for a stand-alone generator at a forward position is eliminated.

FIG. 1 shows an example power network 100 with a BCP 102. The power network 100 includes a vehicle 101, the BCP 102, and a power grid 108. The vehicle 101 further includes a combustion engine 104, battery 106, a starter (not shown), and an alternator (not shown). Modifications can be made to the vehicle 102 so that it can interface with the BCP 102. The BCP 102 includes various interfaces that are described below with respect to FIGS. 2 and 3 for interacting with the power grid 108.

A vehicle 101 utilizing the BCP 102 may form a microgrid 108 of vehicles. Microgrid technology is being explored for electronic vehicles as a means of reducing carbon emissions, reducing consumer reliance on fossil fuels for energy generation, and producing a mobile energy source. Similar concepts can be applied to the microgrid created using the BCP 102 described herein. The vehicle battery 106 can be used as a mobile energy storage device capable of exporting power to peripherals as well as receiving power from other vehicles in the microgrid 108 or the vehicle's own engine. The microgrid 108 can reduce reliance on bulky fossil fuel generators by using the vehicle's engine 104 to recharge the batteries contained in the microgrid. The BCP 102 enables multiple vehicles to connect into a mobile microgrid 108, which is capable of providing more power than a single vehicle 101. Controls ensure battery health throughout the microgrid 108 remains adequate to operate the vehicle 101 in transportation mode at all times.

The engine 104 of the vehicle 101 can have a manual start mechanism and/or an electric starter controlled by an engine switch. In the case of an electric starter, the electric starter can further include a combination switch, a regulator rectifier, a starter battery, a starter motor, and a starter solenoid. The BCP 102 can by-pass the engine 104 switch by connecting the BCP 102 with the engine ignition wire, the battery 106, and the loads.

Figure 2:
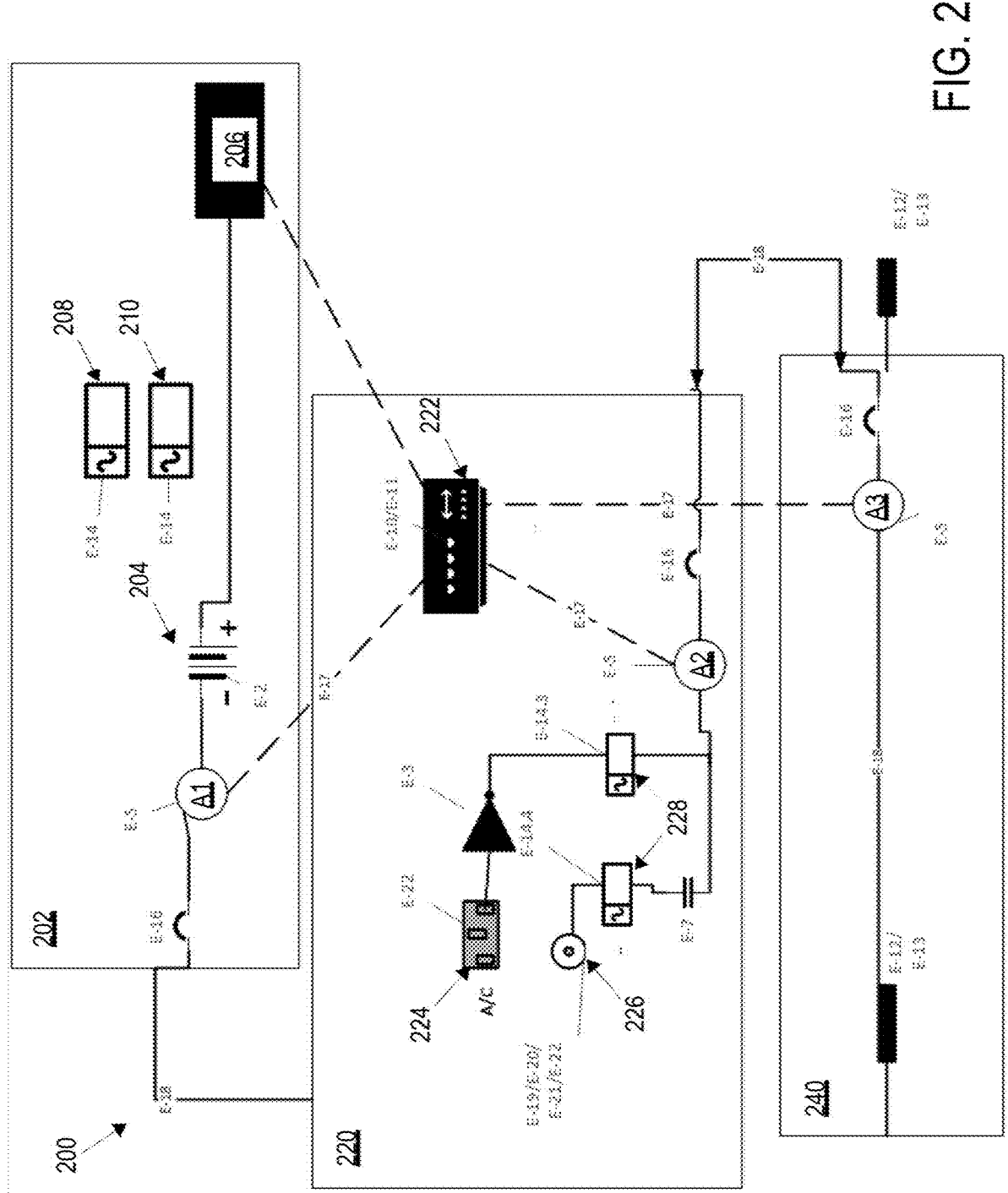
FIG. 2 shows an example system diagram for a power network with a BCP.

FIG. 2 shows an example system diagram for a power network 200 with a BCP 220. The power network 200 includes a vehicle 202, the BCP 220, and a power grid 240. The vehicle further includes a battery 204, a combustion engine 206, a kill-switch relay 208, an ignition relay 210, and a battery current sensor A1. The battery 204 and combustion engine 206 can be similar as described above with respect to FIG. 1.

The battery current sensor A1 is configured to measure load on the battery 204 to determine, in conjunction with the other sensors, whether the battery 204 can provide needed power for the onboard loads, whether the battery 204 can provide power to the grid 240, whether the engine 206 should be turned on top charge the battery 204, or whether the grid 240 has a surplus and can charge the battery 204. The battery current sensor A1 serves as feedback to the control algorithm of controller 222 to ensure the battery 204 stays at a predetermined level of charge (i.e., the battery 204 should never be allowed to discharge to the point where it cannot start the vehicle 202).

The BCP 220 further includes a controller 222, an AC outlet 224, a DC outlet 226, relays 228, and a peripheral current sensor A2. The relays 228 in the BCP 220 control the remote start portion of the engine control 208, 210. In this implementation, the relays 228 take the place of the circuitry 208, 210 built into the key ignition in the combustion engine 206. The program for the controller logic 222 opens and closes the relays 228 to complete or break the circuits 208, 210 as necessary, based on the desired action (i.e START, RUN, KILL SWITCH, etc.) of the combustion engine 206.

The peripheral current sensor A2 is used by BCP 220 to monitor onboard, mission loads for devices like communications equipment, etc. This peripheral current sensor A2 allows the controller 222 to determine if (1) the engine 206 should turn on to provide electricity to the peripherals or (2) the battery 204 should be charged from the grid 240 if the battery 204 is insufficient to meet the present demand of the loads.

For safety, the "normally open" position of the relays 228 is connected to the START and RUN ("ON") circuits 208, 210. When the BCP system 220 is powered down, the circuits 208, 210 are open and neither attempt to start the engine 206 nor allow it to run. Typically when the circuit is energized, all circuits 208, 210 switch momentarily to the Normally Open (NO) position. This would normally cause the engine 208 to attempt to start every time the BCP system 220 is energized. To overcome this typical behavior, a third relay (not shown) can be added to the BCP system 220. This third relay acts as a controllable NOT logic gate, wired to the Normally Closed (NC) position in series with the START circuit 210. This NC position changes to OPEN when the circuit is initially energized and breaks the circuit until the BCP system 220 has booted up and takes control of the relay allowing for control of the START and RUN circuits 208, 210 as desired.

During an initial iteration of the BCP system 220, one battery 204 was utilized to provide power to start the engine 206, to sustain the loads when connected, and to run the controller 222. After initial testing, it was found that the instantaneous voltage output of the battery 204 would drop as the engine started, which caused the controller 222 (e.g., Raspberry Pi, etc.) to turn off and reset, requiring human intervention to re-open the code program on the controller 222. Since human intervention is undesirable each time the engine 206 must be started, the BCP system 220 may have a second battery (not shown) in some embodiments. The second battery can be connected in parallel to the first battery 204 and provides continuous power to the controller 222 during starter actuation. This system configuration provides a large power reservoir 204 and ensures that the controller 222 does not experience a significant voltage drop at engine 206 start. The two batteries can be connected together in order to charge and discharge voltage as the BCP system 220 requires. Both batteries can be charged by the alternator when the engine 206 is running.

The power grid 240 includes a grid current sensor A3 and other vehicles (not shown). The BCP 220 forms a microgrid among the vehicle 202 and other vehicles. In the microgrid configuration, a load too large for the vehicle 202 to sustain for an extended period, such as spotlights or a refrigerator, can be distributed among several vehicles enabling the load to be successfully powered.

The grid current sensor A3 is used to determine whether the grid has an energy surplus or energy need. The BCP 220 allows the vehicle 202 to interface with the grid 240. If the grid current sensor A3 specifies that the grid 240 needs energy, then vehicle battery 204 can provide energy through the BCP 220. When the grid 240 is using energy from the battery 240, the vehicle battery 204 may depleted until it hits a certain threshold, then the vehicle's engine 206 can be turned on by the BCP 220 to charge the battery 204, where the vehicle 202 ultimately provides energy to the grid 240 as a generator via the battery 204. If the grid current sensor A3 specifies that the grid 240 has a surplus, then the energy from the gird 240 can be used to charge the vehicle's batteries 204 through the BCP 220.

Further, the current sensors A1, A2, A3 can also be used by the BCP 220 to determine the direction of energy flow. A battery current sensor A1 reading of "into the battery" denotes that the battery 204 is charging either from the grid 240 or from the combustion engine 206. A grid current sensor A3 reading of "into the grid" denotes that the battery 204 or combustion engine 206 is powering the grid 240.

Figure 3:
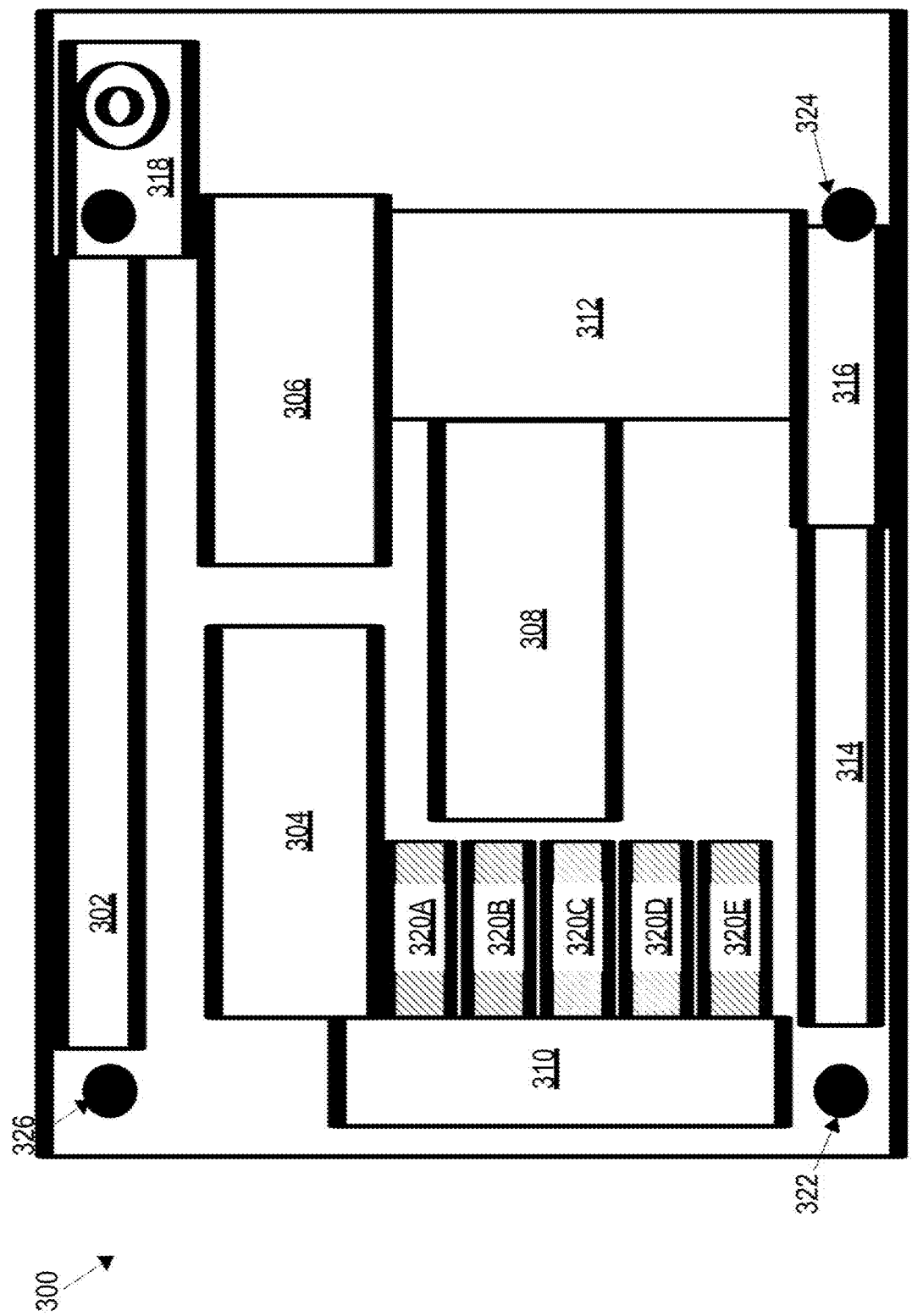
FIG. 3 shows an example circuitry diagram of a BCP.

FIG. 3 shows an example circuitry diagram of a BCP 300. The BCP 300 includes a controller connection 302, an alternating to direct converter 304, an operational amplifier (OpAmp) 306, a voltage divider 308, voltage sensor inputs 310, OpAmp resistors 312, current sensor inputs 314, relay controls 316, ground 318, voltage sensors 320A-E, a grid interface 322, a low power interface (LPI) 324, and a higher power interface (HPI) 326.

In one example, the BCP system 300 can be printed on a circuit bird (e.g., Aisler). The controller connection 302 is configured to be linked to a controller such as a Raspberry Pi. Four 10-amp relays can be located on the BCP 300, three of which are utilized as logic circuits for starting and stopping the engine. The relays are controlled by the controller via the relay ports 316 located on the PCB. Standard 16-gauge insolated copper wire can be used to connect the relays to the engine ignition circuit, the engine run/stop circuit, and the relay control circuit.

AC outlets and USB ports can be provided to the BCP 300 via a power inverter. The AC and USB outlets allow for the BCP 300 to power AC loads. For example, the power inverter can be connected to the HPI terminal 326 via a male cigarette outlet.

DC outlets 322, 324, 326 can located on the BCP and labeled as the high power 326, low power 324, and grid interfaces 322. Three DC outlets are allocated for each interface 322, 324, 326. The DC outlets can be connected to a 10-amp circuit breaker, which allows power to flow from the battery, through the breaker, and to the outlet when the breaker is in the "ON" position. The circuit breakers are also connected to the voltage sensor 310 on the PCB in order for the BCP 300 to monitor the voltage at each interface 322, 324, 326.

Three current sensor inputs 314 are located on the BCP 300 between the grid 322 and low power interface 324. In some embodiments, the current sensor inputs 314 can measure loads between −30 amps and 30 amps. The current sensors can be connected to current sensor inputs 314 BCP 300 via ribbon cables in order to monitor real time LPI 324, HPI 326, and grid interface 322 values.

In some cases, switches can be added to the BCP 300 to more quickly disconnect a load and to provide another layer of protection to the BCP system 300 since each switch contains a circuit breaker fuse rated at 10 amps. Another switch can be added to provide a quick "on/off" button for the controller. Additionally, a system "cut-out" button can be added in order to immediately stop the engine.

In this example, the OpAmp 306 is configured to scale a command signal from the controller to the appropriate voltage for controlling a change of relay state via the relay controls 316.

Figure 4:
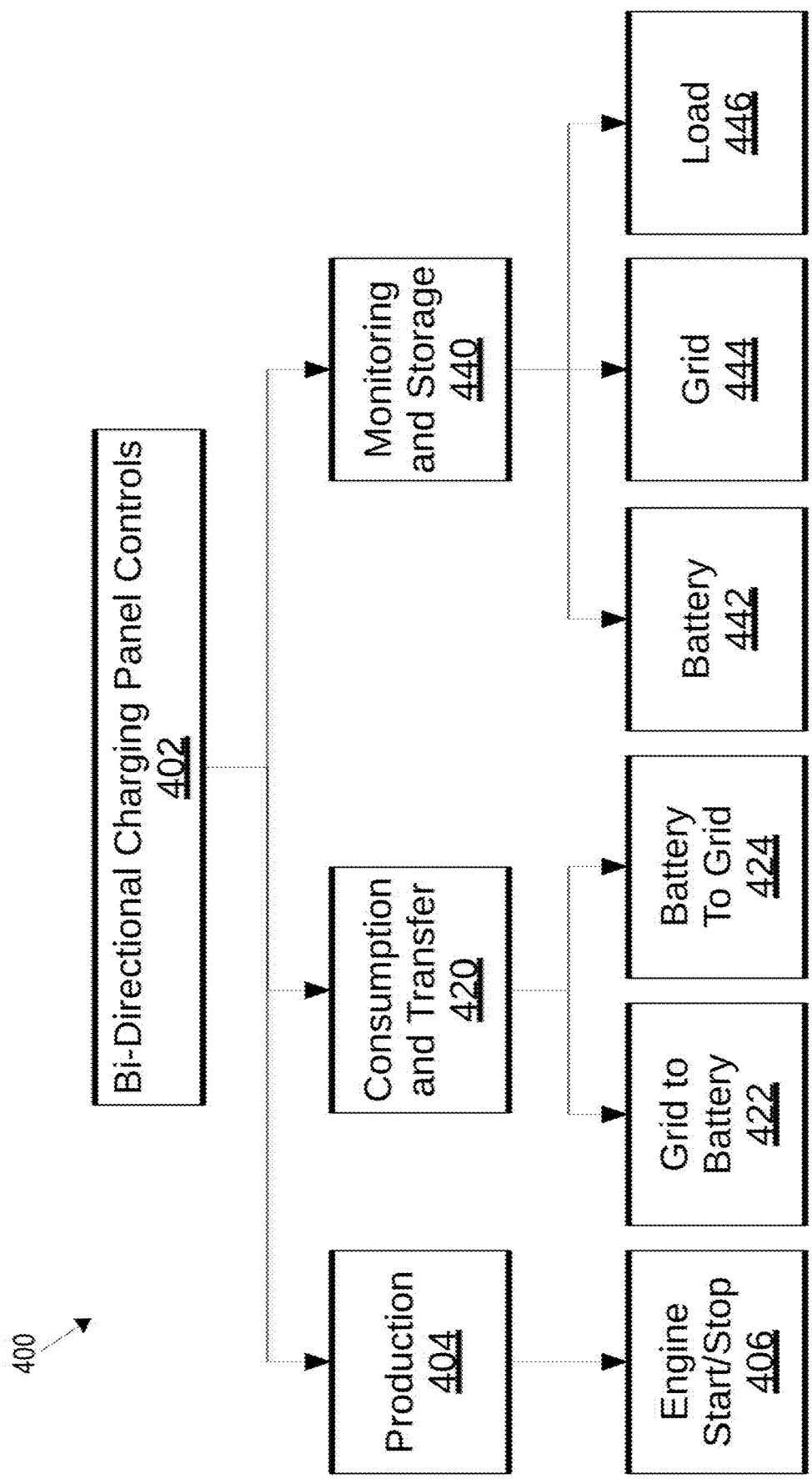
FIG. 4 shows a functionality flowchart for a BCP.
Embodiments in accordance with the invention are further described herein with reference to the drawings.

FIG. 4 shows a functionality flowchart 400 for a BCP. The flowchart 400 shows three main functional categories 404, 420, 440 related to power for the BCP panel controls 402. Under production 404, the BCP should be capable of starting and stopping the vehicle engine (and attached alternator) to control the production of power for charging the battery in step 406. The second category 420 is related to the consumption and transfer of power from grid-to-battery 422 and battery-to-grid 424. The consumption and transfer functionality 420 can be accomplished through a single set of components so that the BCP qualifies as bi-directional. The final main functional category 440 is monitoring and storage. Monitoring and storage functions apply to the battery 442, grid 444, and peripheral 446 load components of the BCP.

Human intervention is required only to ensure that the BCP is connected to power. The BCP can then automatically turn on the engine when the system battery voltage reaches the lower battery threshold in block 406. In some embodiments once started, the engine runs until the battery attains the charge of 12.1V and then for an additional 30 minutes. This is to account for the higher sensor reading recorded by the controller when the alternator is providing power to the batteries and the BCP.

Switches on the BCP can allow power to flow from the power source to one of the interfaces (e.g., LPI, HPI, grid interface) in block 424 or vice versa in block 422. The BCP can also monitor a moving average of voltages and currents measured at the battery in block 442, at the grid interface in block 444, and the high/low interface in block 446. In block 442, the BCP monitors the battery charge so that the battery maintains enough power to start the engine. Additionally, the BCP provides continuous power to the grid interface in block 424, when connected. This connection provides the bi-directional charging capability allowing power to be given to a load connected to the grid interface (block 424) and be received through the same interface (block 422).

Components of the invention may be implemented on virtually any type of computer regardless of the platform being used. For example, a computer system can include a processor, associated memory, a storage device, and numerous other elements and functionalities typical of today's computers. The computer may also include input means, such as a keyboard and a mouse, and output means, such as a display. The computer system may be connected to a local area network (LAN) or a wide area network (e.g., the Internet) via a network interface connection (not shown). Those skilled in the art will appreciate that these input and output means may take other forms.

Further, those skilled in the art will appreciate that one or more elements of the aforementioned computer system may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

The previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A bidirectional charging panel comprising:
   at least one relay for controlling a combustion engine, the at least one relay further comprising:
   a start relay connected to a start switch of the combustion engine;
   a run relay connected to a run switch of the combustion engine, wherein the start and run relays are in a normally open position when energized; and
   a control relay wired to a normally closed position in series with the start relay and the start switch, wherein the control relay is initially energized to prevent the combustion engine from starting when the bidirectional charging panel is booting;
   at least one battery voltage sensor for monitoring a battery voltage level of an engine battery, the battery operatively connected to the combustion engine;
   a grid switch to transfer continuous power between the engine battery and a grid interface;
   the grid interface further comprising:

at least one grid voltage sensor for monitoring a grid voltage level of a grid of devices, and a grid direct current (DC) outlet operatively connected to the at least one grid voltage sensor, the grid DC outlet for transferring power to and from the grid of devices;

a controller to manage the flow of power between the engine battery and the grid of devices, the controller to:

in response to determining that the battery voltage level is below a minimum voltage, using the at least one relay to start the combustion engine;

after determining that the battery voltage level is at least a maximum voltage, using the at least one relay to stop the combustion engine; and in response to determining the battery voltage level is lower than the grid voltage level, using the grid interface to transfer power from the grid of devices to the engine battery.

2. The bidirectional charging panel of claim 1, further comprising a high power interface that further comprises:

at least one high voltage sensor for monitoring a high voltage level of a high power device, and a high DC outlet operatively connected to the at least one high voltage sensor, the high DC outlet for transferring power to and from the high power device.

3. The bidirectional charging panel of claim 2, further comprising an engine battery current sensor to determine a battery load on the engine battery, wherein the controller is further to use the at least one relay to start the combustion engine in response to determining that the battery load is below a minimum load.

4. The bidirectional charging panel of claim 3, further comprising a peripheral current sensor to determine a device load of the high power device, wherein the controller is further to use the grid interface to obtain additional load for the higher power device in response to determining that the peripheral load exceeds the battery load.

5. The bidirectional charging panel of claim 1, further comprising a lower power interface that further comprises:

at least one low voltage sensor for monitoring a low voltage level of a low power device, and a low DC outlet operatively connected to the at least one low voltage sensor, the low DC outlet for transferring power to and from the low power device.

6. The bidirectional charging panel of claim 1, further comprising a controller battery to power the controller, wherein the controller battery is connected in parallel with the engine battery.

7. The bidirectional charging panel of claim 1, further comprising a grid current sensor to determine a grid load on the grid of devices, wherein the controller is further to use the grid interface to obtain additional load in response to determining that the grid load indicates that the grid of devices has an energy surplus.

8. The bidirectional charging panel of claim 7, wherein the controller is further to use the grid interface to send excess load from the engine battery in response to determining that the grid load indicates that the grid of devices has an energy need.

9. A method for controlling a bidirectional charging panel, the method comprising:

energizing a control relay, the control relay being wired to a normally closed position in series with a start relay, to prevent a combustion engine from starting while the bidirectional charging panel is booting;

deenergizing the control relay after the bidirectional charging panel finishes booting;

using at least one battery voltage sensor to monitor a battery voltage level of an engine battery;

in response to determining that the battery voltage level is below a minimum voltage, using the start relay to start the combustion engine;

after determining that the battery voltage level is at least a maximum voltage, using the start relay to stop the combustion engine;

using at least one grid voltage sensor to monitor a grid voltage level of a grid of devices; and in response to determining the battery voltage level is lower than the grid voltage level, using a grid interface to transfer power from the grid of devices to the engine battery.

10. The method of claim 9, further comprising:

using an engine battery current sensor to determine a battery load on the engine battery;

using a peripheral current sensor to determine a device load of a high power device; and using the grid interface to obtain additional load for the higher power device in response to determining that the peripheral load exceeds the battery load.

11. The method of claim 9, further comprising a lower power interface that further comprises:

using a grid current sensor to determine a grid load on the grid of devices;

using the grid interface to obtain additional load in response to determining that the grid load indicates that the grid of devices has an energy surplus.

12. The method of claim 11, further comprising using the grid interface to send excess load from the engine battery in response to determining that the grid load indicates that the grid of devices has an energy need.

* * * * *